US011704365B2

(12) United States Patent
Li et al.

(10) Patent No.: US 11,704,365 B2
(45) Date of Patent: Jul. 18, 2023

(54) GRAPH STORAGE IN A DATABASE

(71) Applicant: PayPal, Inc., San Jose, CA (US)

(72) Inventors: Xin Li, Shanghai (CN); Lei Wang, Shanghai (CN); Xin Chen, Shanghai (CN); Pengshan Zhang, Shanghai (CN); Jun Zhang, Shanghai (CN); Haoran Zhang, Shanghai (CN); Quin Zuo, Cupertino, CA (US); Junsheng Tan, Shanghai (CN); Ying Yue, Nanjing (CN); Chao Zhang, Shanghai (CN); Xiaohan Yun, Palo Alto, CA (US); Zhenyin Yang, Saratoga, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/356,192

(22) Filed: Jun. 23, 2021

(65) Prior Publication Data

US 2022/0004580 A1    Jan. 6, 2022

(30) Foreign Application Priority Data

Jul. 1, 2020    (WO) ................ PCT/CN2020/099761

(51) Int. Cl.
*G06F 16/901*  (2019.01)
*G06F 16/903*  (2019.01)

(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS 9,158,801 B2   10/2015   Lassen et al.
9,602,513 B2   3/2017    Gamage et al.
(Continued)

FOREIGN PATENT DOCUMENTS

CN    105808779 A    7/2016
CN    110941619 A    3/2020

OTHER PUBLICATIONS

"row." FOLDOC: Free On-Line Dictionary of Computing. Published on Mar. 22, 2002. Accessed Aug. 3, 2022 from http://foldoc.org/row (Year: 2002).*

(Continued)

*Primary Examiner* — Alex Gofman
*Assistant Examiner* — Umar Mian
(74) *Attorney, Agent, or Firm* — Kowert, Hood, Munyon, Rankin & Goetzel, P.C.; Erik A. Heter; Dean M. Munyon

(57) ABSTRACT

Techniques are disclosed for storing an arranging data in a database. A method includes a computer system storing, in a database, data indicative of a graph data structure having a plurality of nodes connected by a plurality of edges. The method further includes the computer system determining that a number of edges connected to a first node satisfies a threshold number. In response to the determining, the computer system may store an index in an index row associated with the first node. The index identifies a first row having first and second ranges of values stored in first and second rows, respectively. The values in the first and second rows correspond to edges connected to the first node. The values in the first and second ranges are usable to indicate properties of corresponding ones of the plurality of edges.

20 Claims, 9 Drawing Sheets

(56) References Cited

U.S. PATENT DOCUMENTS

| | | | |
|---|---|---|---|
| 9,977,807 B1* | 5/2018 | Bowman | G06F 16/381 |
| 10,606,892 B1* | 3/2020 | Broecheler | G06F 16/278 |
| 2017/0212919 A1* | 7/2017 | Li | G06F 13/1668 |
| 2018/0144004 A1* | 5/2018 | Bedi | G06F 16/9024 |
| 2019/0294733 A1* | 9/2019 | Scheideler | G06F 16/9024 |

OTHER PUBLICATIONS

Weisstein, Eric W. "Graph Vertex." From MathWorld—A Wolfram Web Resource. Accessed Mar. 16, 2022 from https://mathworld.wolfram.com/GraphVertex.html (Year: 2022).*

Zhang, Yiming, et al. "GraphA: Efficient partitioning and storage for distributed graph computation." IEEE Transactions on Services Computing 14.1 (2017): 155-166. (Year: 2017).*

Wang, Dawei, Wanqiu Cui, and Biao Qin. "Graph Compression Storage Based on Spatial Cluster Entity Optimization." IEEE Access 8 (2020): 29075-29088. (Year: 2020).*

International Search Report and Written Opinion in PCT Appl. No PCT/CN2020/099761 dated Mar. 31, 2021, 9 pages.

* cited by examiner

GRAPH STORAGE IN A DATABASE

PRIORITY CLAIM

The present application claims priority to PCT Appl. No. PCT/CN2020/099761, filed Jul. 1, 2020, which is incorporated by referenced herein in its entirety.

BACKGROUND

Technical Field

This disclosure is directed to databases, and more particularly, mechanisms for storing data within a database.

Description of the Related Art

Databases are repositories of data arranged to support efficient data retrieval. Multiple types of databases exist to support the requirements of various industries and organization. Databases may be specialized to store various types of data. The types of data may include (but are not limited to) binary files, documents, images, video files, multi-dimensional data, and so on. Within a database, data can be stored in various forms, such as tabular, hierarchical, and graphical.

Some databases may store data in a manner that can be represented by a graph structure. The graph structure may include a number of different nodes/vertexes that can represent an entity involved in some sort of relationship or interaction. The nodes of the graph may be connected to other nodes by edges/links. The edges may represent relationships or interactions between the nodes to which they are connected.

SUMMARY

Techniques are disclosed for storing and arranging data in a database. In one embodiment, a method includes a computer system storing, in a database, data indicative of a graph data structure having a plurality of nodes connected by a plurality of edges. The method further includes the computer system determining that a number of edges connected to a first node satisfies a threshold number. In response to the determining, the computer system may store an index in an index row associated with the first node. The index identifies a first row having first and second ranges of values stored in first and second rows, respectively. The values in the first and second rows correspond to edges connected to the first node. The values in the first and second ranges are usable to indicate properties of corresponding ones of the plurality of edges.

In various embodiments, when a value row becomes full (e.g., when the number of edges satisfies the threshold), a new range of values may be added to the index, with a new row corresponding to the new range being added. For each range of values within an index, a pointer may be provided that points to the corresponding row in which values in that range is stored. The index row may store multiple indexes, with the indexes being associated with a certain data type. A query to the database associated with a particular node may access the index row for that node, access an appropriate index for the type of data sought by the query, and access the appropriate range within the index. Thereafter, the data may be obtained from the row pointed to by the appropriate range.

In some embodiments, the database may also implement one or more global indexes that are associated to a particular type of data. Queries to the database that access the global index may result in accessing records according to the particular type from more than one row, and may also result in accessing data associated with more than one node.

BRIEF DESCRIPTION OF THE DRAWINGS

The following detailed description makes reference to the accompanying drawings, which are now briefly described.

Figure 1A:
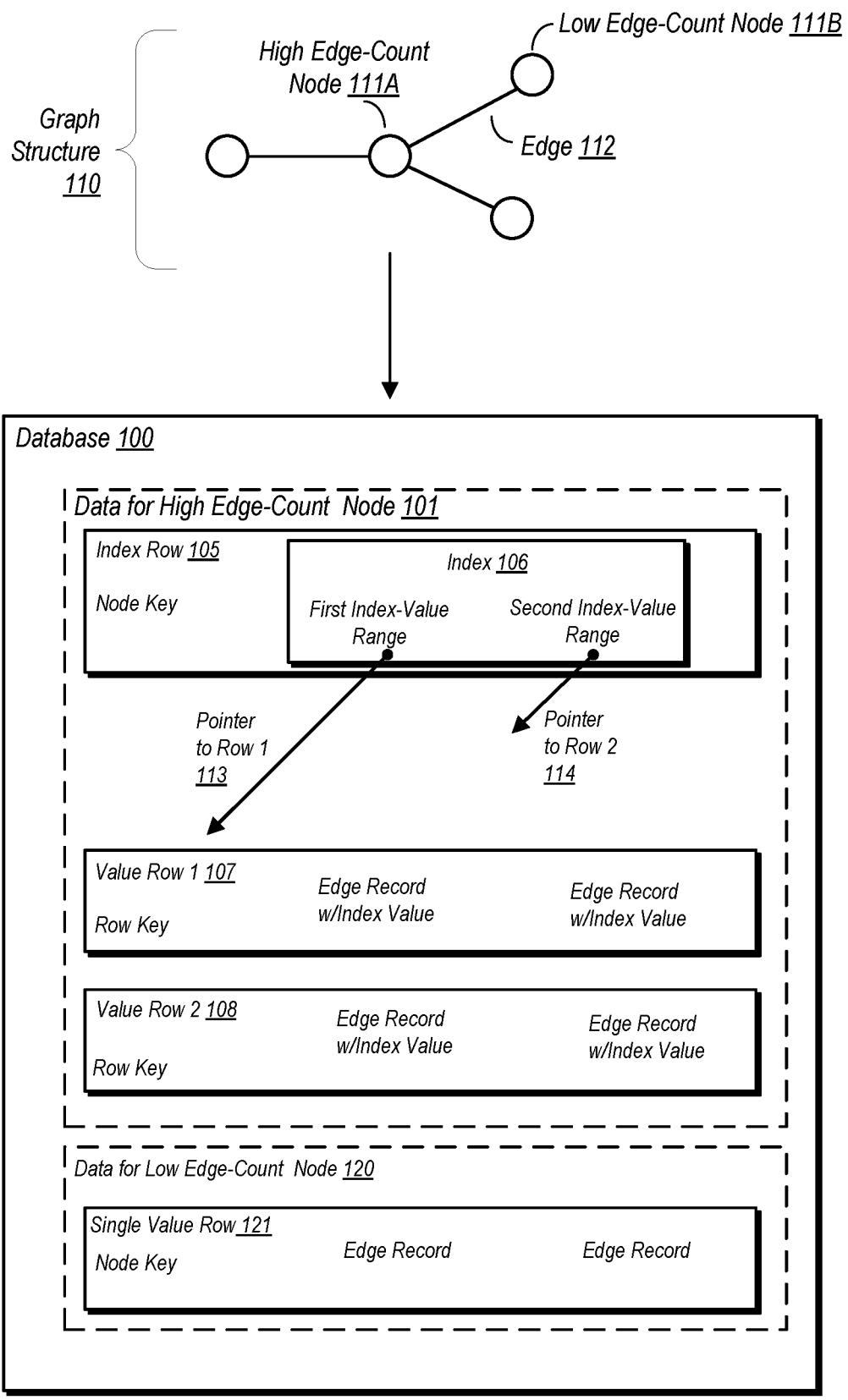
FIG. 1A is a block diagram illustrating one embodiment of a database.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a database arranged for storage of high-degree edges. Certain types of data may be characterized by a graph structure. The graph structure may include a number of nodes and a number of edges. The nodes may represent various entities, such as people, organizations, businesses, and so on. An edge may connect two nodes, and represent an interaction between those nodes (e.g., a financial transaction, interaction on a social network, etc.). Some nodes may have few edges connected thereto, while other nodes may have a large number of edges (which may be referred to as high degree edge nodes). Furthermore, edges may be characterized by multiple types of data. For records having multiple types of data, one or more of these types may be used as a basis for indexing the records.

In storing data for the graph structure described above, one or more value rows may be dedicated to a given node. The values stored in the rows may be representative of edges and define properties of the edges. For some nodes, a single value row may be sufficient for storing the edges coupled to that node. However, for nodes having a large number of edges, a single row may be insufficient for storing the edges connected thereto without increasing the row size. The present disclosure provides a database structure for storing edges for nodes connected to a large number of edges. More generally, the strategy used for storing values of nodes having a low number of edges is separated from that for storing values of nodes having a high number of edges.

For nodes having a large number of edges, an index row may be provided having one or more indexes, along with a number of value rows that store values of edges. The indexes may correspond to a particular value type (e.g., a date of an interaction, amount of a financial transaction, a "like" on a social network, etc.). An index may also include one or more ranges of values. A pointer may be provided for a given range to point to its corresponding row. The corresponding row may store records that include values within the indicated range. During the storage of data, when the number of records in a given value row satisfies a threshold, another value row may be appended to the database, with a corresponding range added to the index for the type of value for which the records are to be indexed. Additionally, multiple indexes may be provided, with the various indexes corresponding to different value types. The multiple indexes may be arranged as the one discussed above, having various ranges of values corresponding to the value type, while value rows corresponding to those ranges are also provided. Various embodiments of such a database are now discussed in further detail.

FIG. 1A is a block diagram illustrating one embodiment of a database. In the embodiment shown, database 100 is arranged to store data that can be characterized by a graph structure. A simplified example is shown as graph structure 110. In the illustrated example, graph structure 110 includes a number of nodes, including a high edge-count (or high degree edge) node 111A and a low edge-count node 111B, which are connected to one another by edge 112. In this particular example, node 111A is considered to be a high edge-count node due to it having three edges connecting to other nodes; node 111B is considered to be a low edge-count node by virtue of having only a single edge connected thereto—although, in some embodiments, the threshold for classifying a node as having a high edge-count may be substantially higher. In practice, the distinction between high edge-count and low edge-count nodes may be based on the number of values (corresponding to edges) that can be stored in a corresponding value row.

It is noted that some nodes may begin as low edge-count nodes for the purposes of storage in database 100, but later become high edge-count nodes as the number of edges accumulates. More particularly, when the number of values in a row (and thus, the number of edges connected to a node) satisfies a threshold, a low edge-count node may become a high edge-count node. In some embodiments, the threshold may be equal to the number of values that can be stored in a given value row. In other embodiments, the threshold may be less than this value in anticipation that another row will be needed to be added in the near future. Generally speaking, the threshold may be set based on the needs of the particular application of database 100.

Database 100 in the embodiment shown includes data 101 for a high edge-count node and data 120 for a low edge-count node. In practice, a database structured according to the disclosure could include data for any suitable number of nodes, including both high and low edge-count nodes.

Data 101 for the high-edge count node shown in FIG. 1A includes an index row 105 and value rows 107 and 108. (As used herein, the term "row" is used to refer generally to a collection of data associated with a key. Accordingly, while the term row may be used to described a row in an embodiment in which database 100 implements a relational database, the term row may also be used to describe data maintained within a value of a key-value pair in an embodiment in which database 100 implements a key-value store.) Index row 105 in this case includes a node key that identifies the node in the graph structure with which it is associated. In this embodiment, index row includes one index 106, which is associated with a particular type of value that may be present in an edge record. Index 106 as shown here includes a first index-value range and a second index-value range. The first index-value range is associated with value row 107, while the second index-value range is associated with value row 108. Value rows 107 and 108 both include corresponding row keys. The first index-value range is associated with a pointer 113 that identifies the row key for value row 107. Similarly, the second index-value range is associated with a pointer 114 that identifies value row 108. Values rows 107 and 108 both store edge records that include values corresponding to the value type indicated by index 106. Accordingly, the edge records are indexed by the values (designated here as "Index Value"). These values may be, for example, dates of an interaction between two nodes, a transaction amount (in the case of financial transactions), social network interactions, or any other information that can represent an interaction between two nodes. More detailed examples will be discussed below with respect to FIGS. 2A and 2B. Thus, sorting and storage of the various edge records is based on their respective index values.

With respect to the data 120 of low edge-count node 111B, only a single value row 121 is provided, with no index row associated with this node. Single value row 121 (single in the sense that is it a single row) includes a node key that associates the row with a particular node in the graph structure. This row may store edge records, but does not include an index value given that there is no index provided for this low edge-count node 111B.

To access data for a given node, a computer system may submit the information sought along with a node key. If the corresponding node is a low-edge count node, the query may lead to a row such as single value row 121. The requested data may be accessed from the row, using techniques such as a binary search. If the corresponding node is a high edge-count node, the corresponding node key may lead to an index row, such as index row 105. Based on the type of data for which access is requested, the appropriate index may then be found. For example, if the data requested is an amount of a financial transaction, and index indicating a value type that is a transaction value may be found. Within the index, the corresponding range into which the index data falls may be found, thereby leading to a corresponding pointer. The pointer then leads to a corresponding value row, where the edge record having the indexed value may be accessed in accordance with a suitable search technique.

As data is added for the corresponding node 111, additional rows may be provided. Consider an example in which both value rows 107 and 108 are full. If new data is to be added for the data type indicated by index 106, another range may be added and a corresponding row may also be added to accommodate the additional data. With the addition of a new range to index 106, another pointer may be instantiated. Edge records stored in the newly appended row may be indexed according to the data type associated with the index.

More generally, rows may be added when a threshold is satisfied, where the threshold indicates a number of values stored in a given row. In some embodiments, this threshold may be equal to the maximum number of edge records that can be stored in a given value row. However, embodiments are also possible and contemplated wherein the threshold is less than the full number of edge records that can be stored in a given value row. This may allow for the instantiating of a new row, range, and pointer, in anticipation that the row satisfying the threshold is close to being full. This may also allow some re-arranging of data between rows if desirable to increase efficiency of accesses.

Figure 1B:
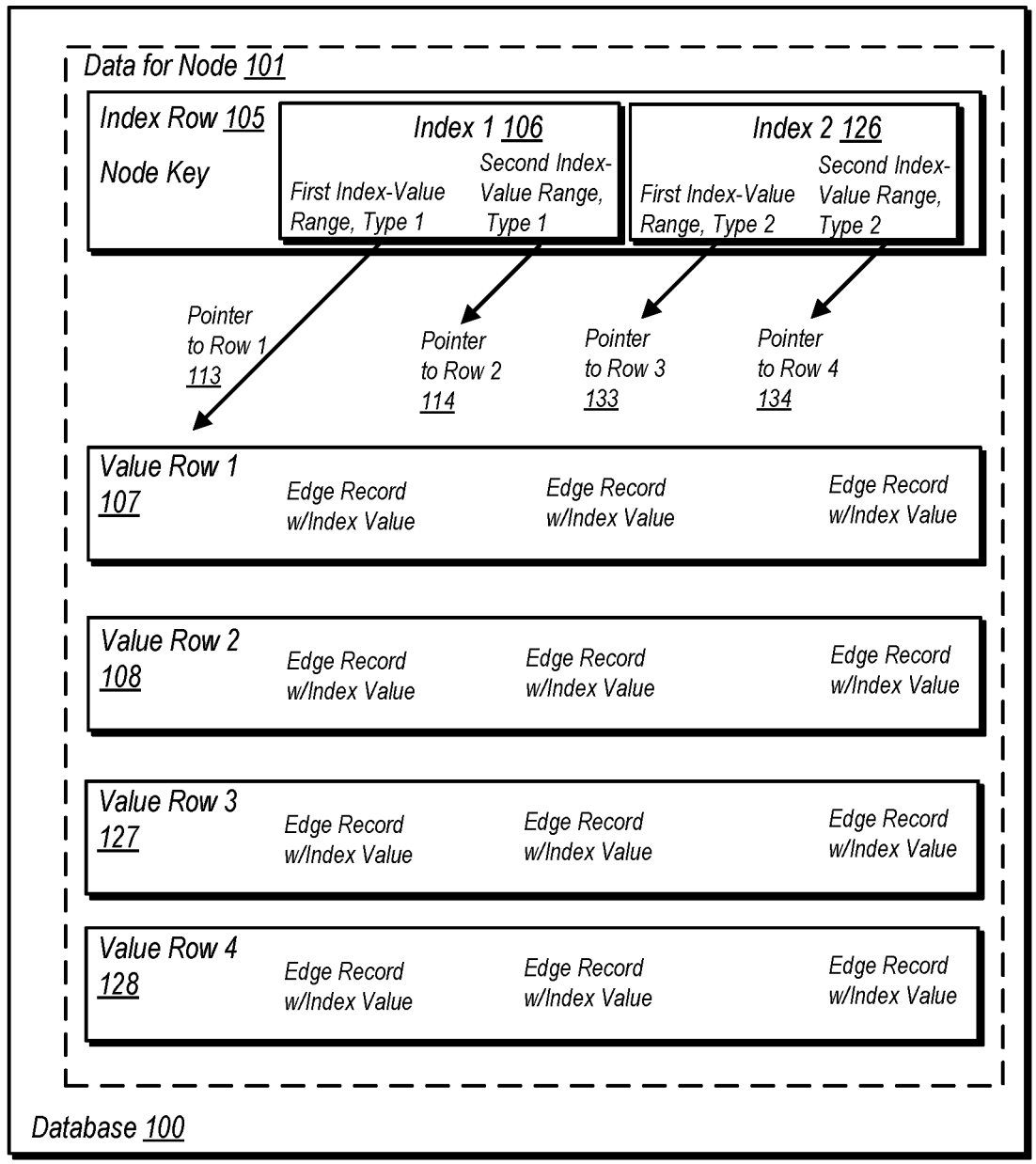
FIG. 1B is a block diagram of an embodiment of a database having multiple indexes in an index row for a high-edge node.

FIG. 1B is a block diagram of an embodiment of a database having multiple indexes in an index row for a high edge-count node. In this particular example, data 101 for the particular node includes two indexes in index row 105. A first index 106 includes first and second index-value ranges that correspond to value rows 107 and 108. The values corresponding to index 106, and thus falling within the ranges, are of a first type designated here as Type 1. A first pointer 113 is provided to point to value row 107, while a second pointer 114 is provided to point to value row 2. Thus, value rows 107 and 108 store edge records that are indexed based on values of the first type, Type 1.

In index 126, first and second ranges of a second type of value, designated here as Type 2, correspond to value rows 127 and 128. Pointers 133 and 134 point to value rows 127 and 128, respectively. Value rows 127 and 128 each store edge records that are indexed based on the Type 2 values.

Generally speaking, any suitable number of indexes may be implemented in a given index row to accommodate indexing based on the corresponding number of different data types. Rows may also be added for the various ranges indicated within each index. As one example, a database such as that shown in FIG. 1B could be implemented to include a first index corresponding first data type that is an amount of a financial transaction. Thus, the corresponding rows may store edge records that are sorted according to a transaction amount. Meanwhile, a second index may correspond to a second data type indicating a date of various financial transactions may also be implemented. The rows associated with the second index may sort the edge records by the date of the transactions.

It is noted that while the example of the previous paragraph is directed to financial transactions, the disclosure is not limited to this type of information. Instead, the disclosure contemplates the storage of any type of data that can be characterized by the graph structure as discussed herein. Furthermore, since there may be multiple aspects to interactions between the nodes of a graph, the edges, and thus the value types upon which indexing is based may vary, with multiple indexes being implemented to allow for the indexing of records according to different data types.

Figure 2A:
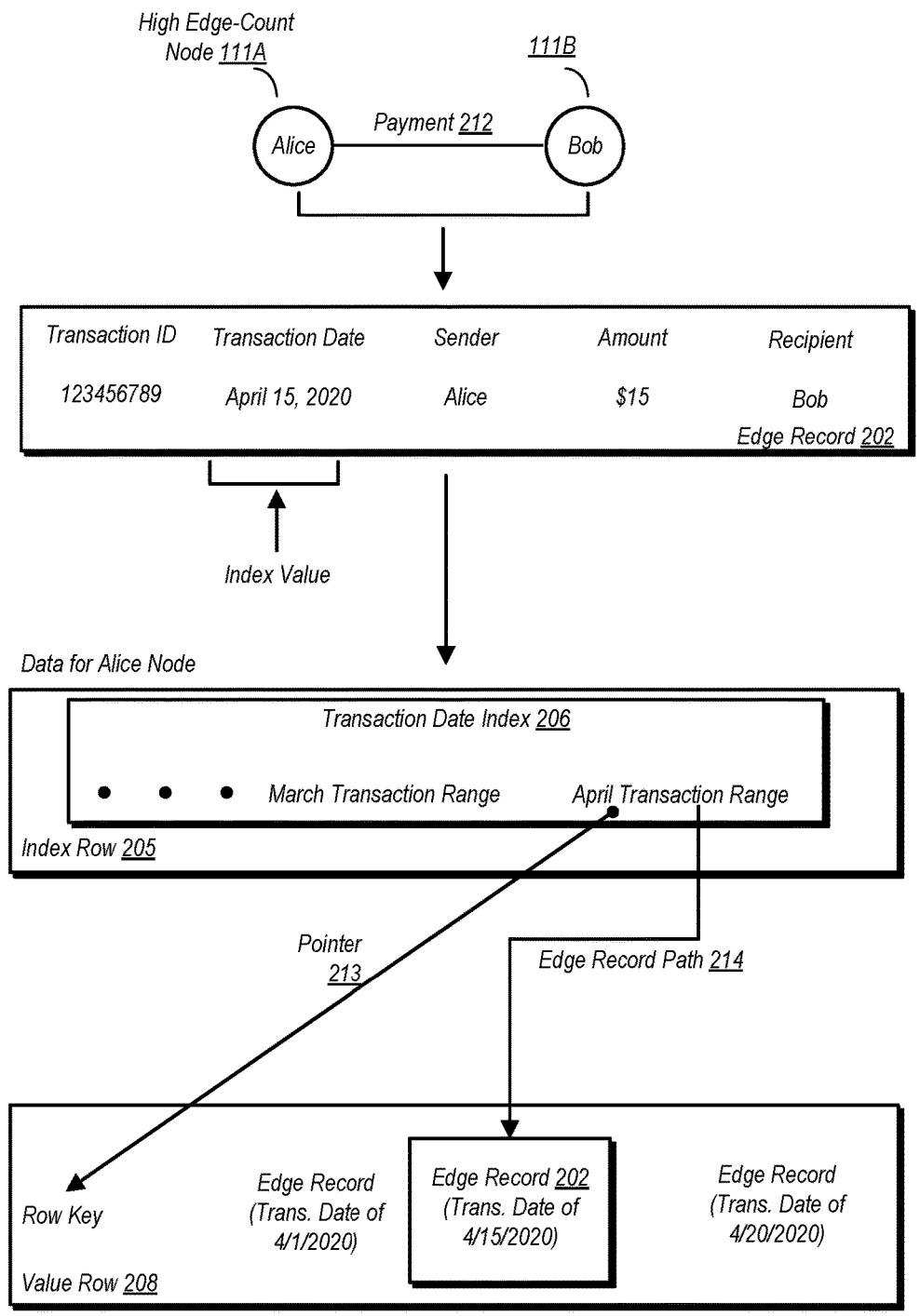
FIG. 2A is a block diagram illustrating an insertion example for one embodiment of a database.

FIG. 2A is a block diagram illustrating an insertion example for one embodiment of a database. More particularly, FIG. 2A illustrates insertion example 200 for a data type that is a transaction amount. In the example of FIG. 2A, a person Alice corresponds to a high edge-count node 111A. Another person, Bob, corresponds to a node 111B (which may be, but is not necessarily, a low edge-count node). The edge connecting these two nodes is payment 212.

The edge record 202 for payment 212 includes a transaction ID, a transaction date, a sender (Alice), a payment amount, and the recipient, which may be identified by the recipient's node key. For this example, the index value for edge record 202 is the transaction date of Apr. 15, 2020. The index row 205 in the illustrated example includes a transaction date index 206, which is used to indicate the indexing of edge records by date. This example of transaction date index 206 includes two date ranges, one for the month of March and another for the month of April. Since the transaction occurred on April $15^{th}$, the transaction falls within the April date range.

A pointer 213 is associated with the April date range. This pointer points to a row key in value row 208, thereby associating the row with the corresponding date range. The edge record 202 may be inserted in a corresponding location within value row 208, via edge record path 214. In this example, the edge records, or values, are sorted sequentially by date, moving left to right. As illustrated here, an edge record corresponding to a transaction occurring on April 1$^{st}$ is stored toward the left of the row. Meanwhile, an edge record corresponding to a transaction taking place on April 20$^{th}$ is stored to the right of edge record 202.

It is noted that in various embodiments, the ranges within a given index may be adjustable to accommodate a number of edge records that can be stored in a given row. For example, if a number of April transactions exceeds the number of storage locations available to store the corresponding edge records, the April transactions may be broken up into multiple ranges. Alternatively, if the number of transactions that occurred in a particular month is less than the number of edge records that can be stored in a row, the index may be adjusted to accommodate dates from the particular month and the next, subsequent month. Generally speaking, the ranges associated with a given index may be flexible to ensure efficient storage of records and to prevent a large number of unused spaces. In some embodiments, some spaces may be reserved in a given row to allow for the insertion of edge records to reduce the number of adjustments for the ranges indicated in an index.

Figure 2B:
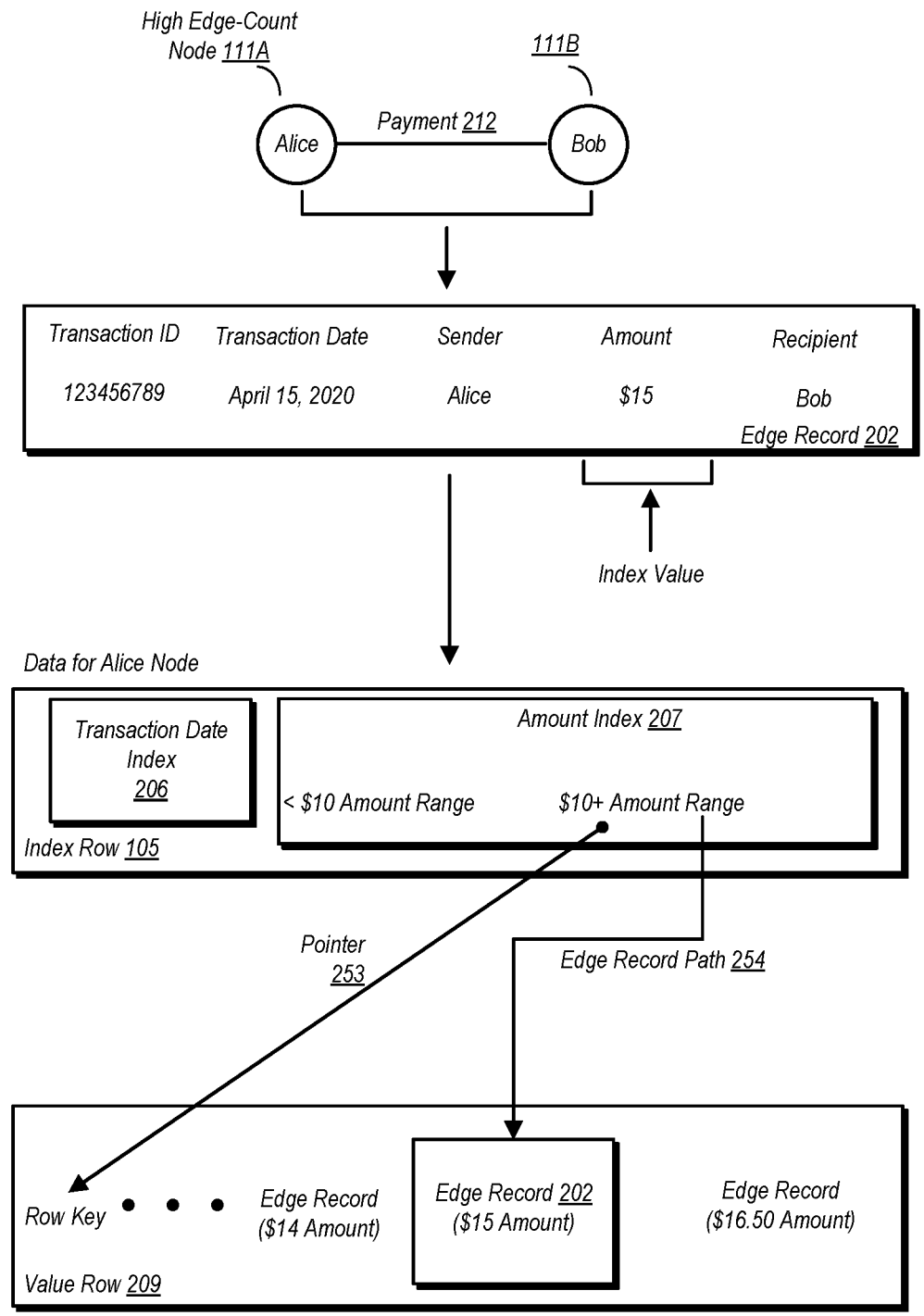
FIG. 2B is a block diagram illustrating another insertion example for one embodiment of a database.

FIG. 2B is a block diagram illustrating another insertion example for one embodiment of a database. Similar to the example of FIG. 2A, insertion example 250 applies to a transaction between Alice (represented by high edge-count node 111A) and Bob (represented by node 111B), the transaction being a payment 212. Edge record 202 in this example includes the same information as the example shown in FIG. 2A. However, in this example, the edge records are indexed by the transaction amount, which is $15 in edge record 202.

Index row 105 in this example includes two indexes, transaction data index 206 and amount index 207. Since the edge records in this example are to be indexed by transaction amount, a computer system performing the insertion accesses amount index 207. The amount index 207 shown here includes two different ranges. A first range corresponds to transactions that are less than $10. The second range corresponds to transactions that are $10 or more. Since the transaction in edge record 202 is a $15 transaction, the $10+ range applies. Pointer 253 points to value row 209, which is used to store edge records that are indexed according to transaction amount. Within value row 209, edge records are stored from the smallest transaction value on the left to the largest transaction value on the right. Edge record 202 in this example is inserted, via edge record path 254, into value row 209 in a location between an edge record having a $14 transaction and another edge record having a $16.50 transaction.

Figure 3A:
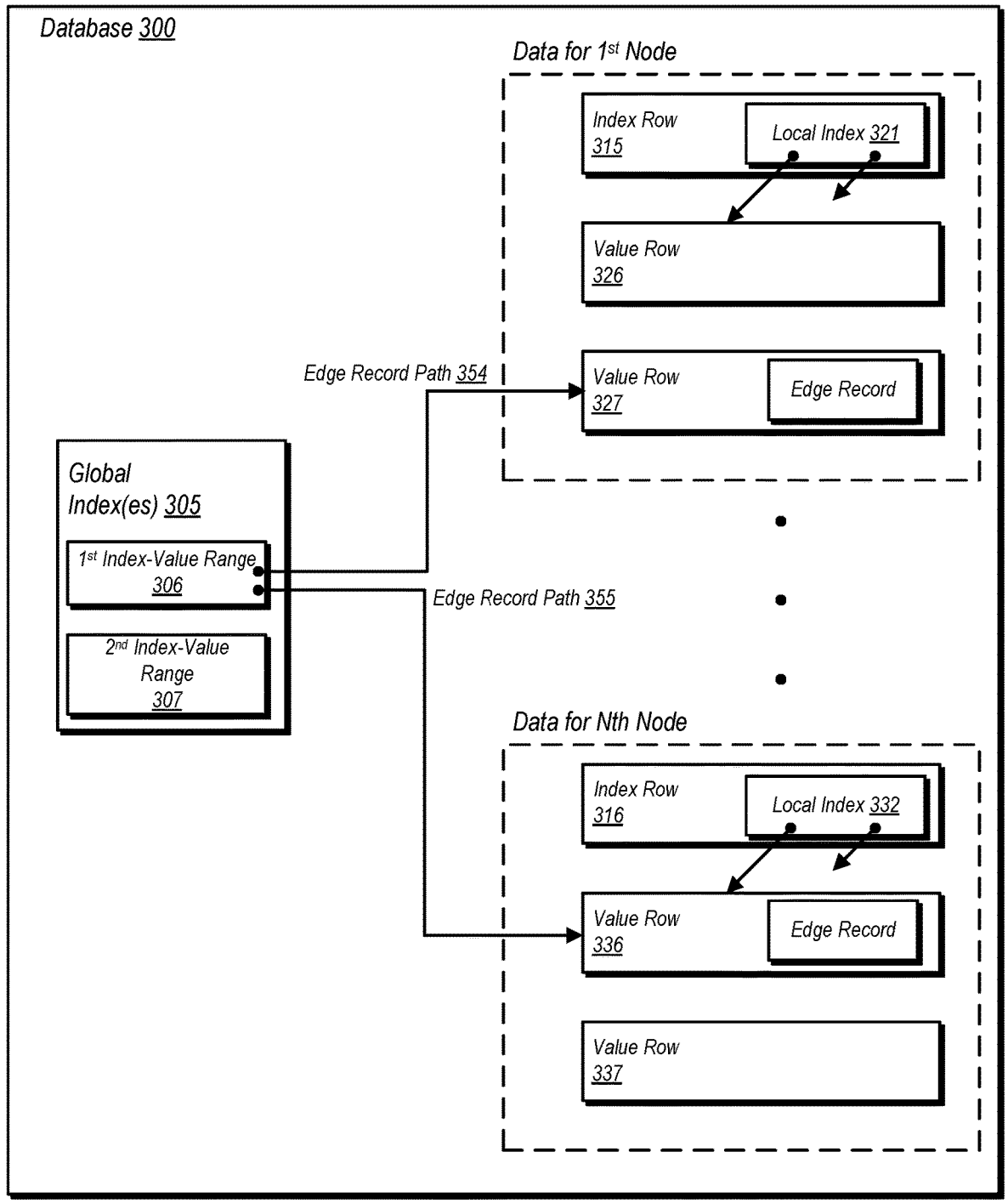
FIG. 3A is a block diagram illustrating one embodiment of a database having a global index.

The present disclosure also contemplates the use of global indexes. FIG. 3A is a block diagram illustrating one embodiment of a database having a global index. In the embodiment shown, database 300 stores data for a number of nodes, including data for a first node and for an Nth node as shown here. Both the data for the first node and the Nth node include respective index rows 315 and 316, which include local indexes 321 and 332, respectively. The local indexes are indicative of particular types of data that are included in the edge records store in the various value rows. Furthermore, the local indexes perform indexing only for data associated with their particular node.

The data for the first node may be stored in rows including value rows 326 and 327, while data for the Nth node may be stored in rows including value rows 336 and 337. As described above, the local indexes also indicate ranges of values that correspond to values stored in various ones of the value rows. In various embodiments, the value rows may store edge records that include values of the type indicated by the index.

Database 300 may also store global index(es) 305. In this example, a single global index having a first index-value range 306 and a second index-value range 307 is provided. The global index may be used to search for data values (or edge records containing the same) within a given range and across a number of different rows associated with different nodes. In this example, edge records having data values of a type indicated by the index and falling within the first index-value range can be found in value row 327, via edge record path 354, and in value row 336, via edge record path 355. A given global index may include the locations within the various nodes of the database for all records including a particular value having a particular type and falling within a particular range.

Figure 3B:
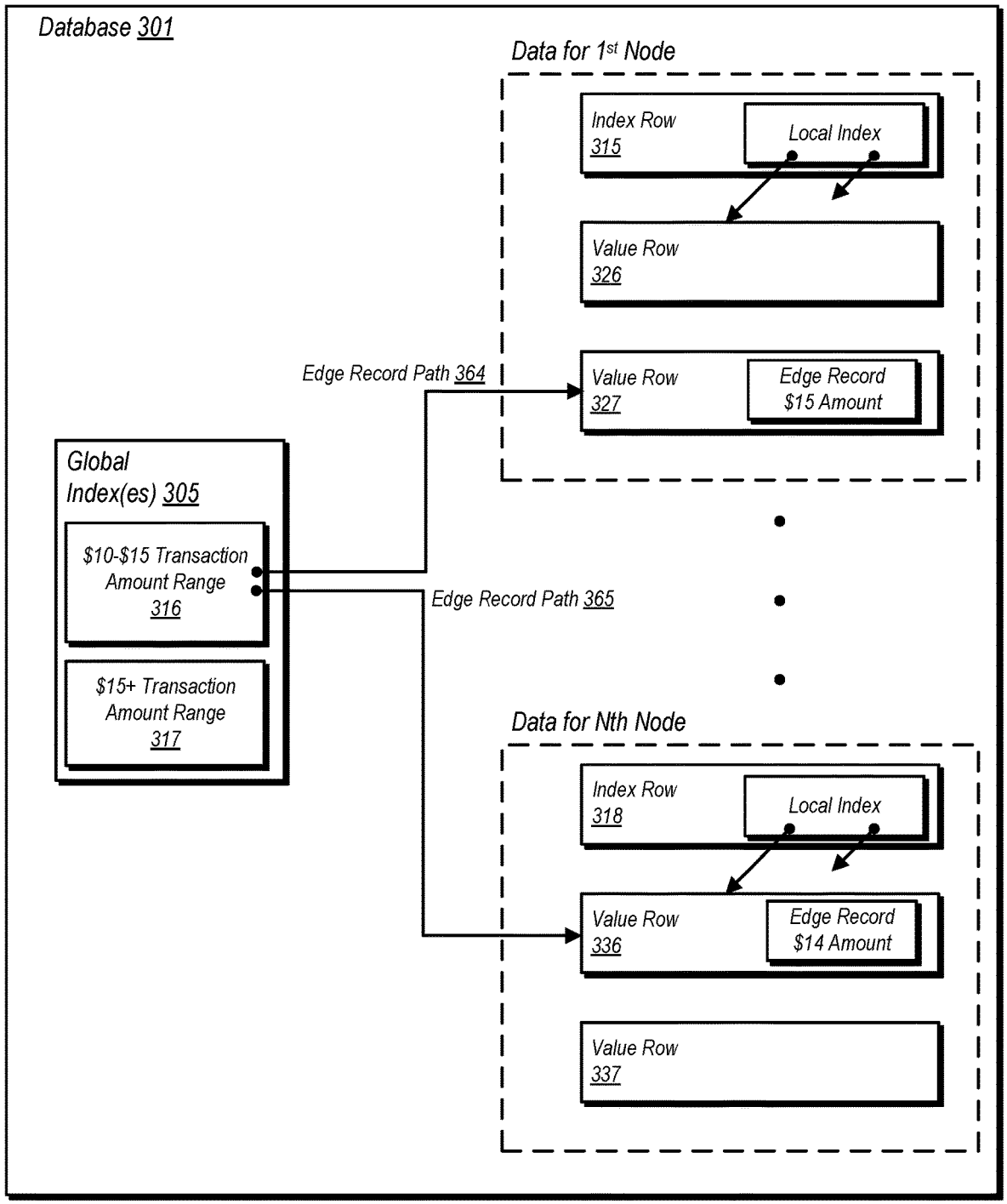
FIG. 3B is a block diagram illustrating a look-up example for one embodiment of a database having a global index.

FIG. 3B provides a look-up example using a global index in database 301. In the embodiment shown, database 301 is arranged similarly to database 300 of FIG. 3A. A global index 305 is associated with a data value type that is a financial transaction amount. A first range 316 corresponds to transactions having a value between $10 and $15. A second range corresponds to a range in which transactions are $15 or more. The look-up (or query) in this example is for transactions falling within the first range of values, namely between $10 and $15 dollars. Via edge record path 364, an edge record including a transaction of an amount of $15 may be retrieved from value row 327. Another edge record, showing an amount of $14, is retrieved via edge record path 365 from value row 336. Thus, as illustrated by the example, the use of global indexes may allow edge records or indexed values therein to be retrieved from different value rows across a number of different nodes.

In embodiments of a database that includes global indexing, a global index corresponding to a particular data type may be updated any time a value of that type (or edge record including that data type) is inserted into a value row. For example, when the edge record for the $15 amount is inserted into value row 327, the associated global index 305 may be updated to indicate the location of the edge record. Similarly, when the edge record for the $14 transaction is inserted into value row 336, the associated global index may be updated to indicate the location of this edge record as well.

Figure 4:
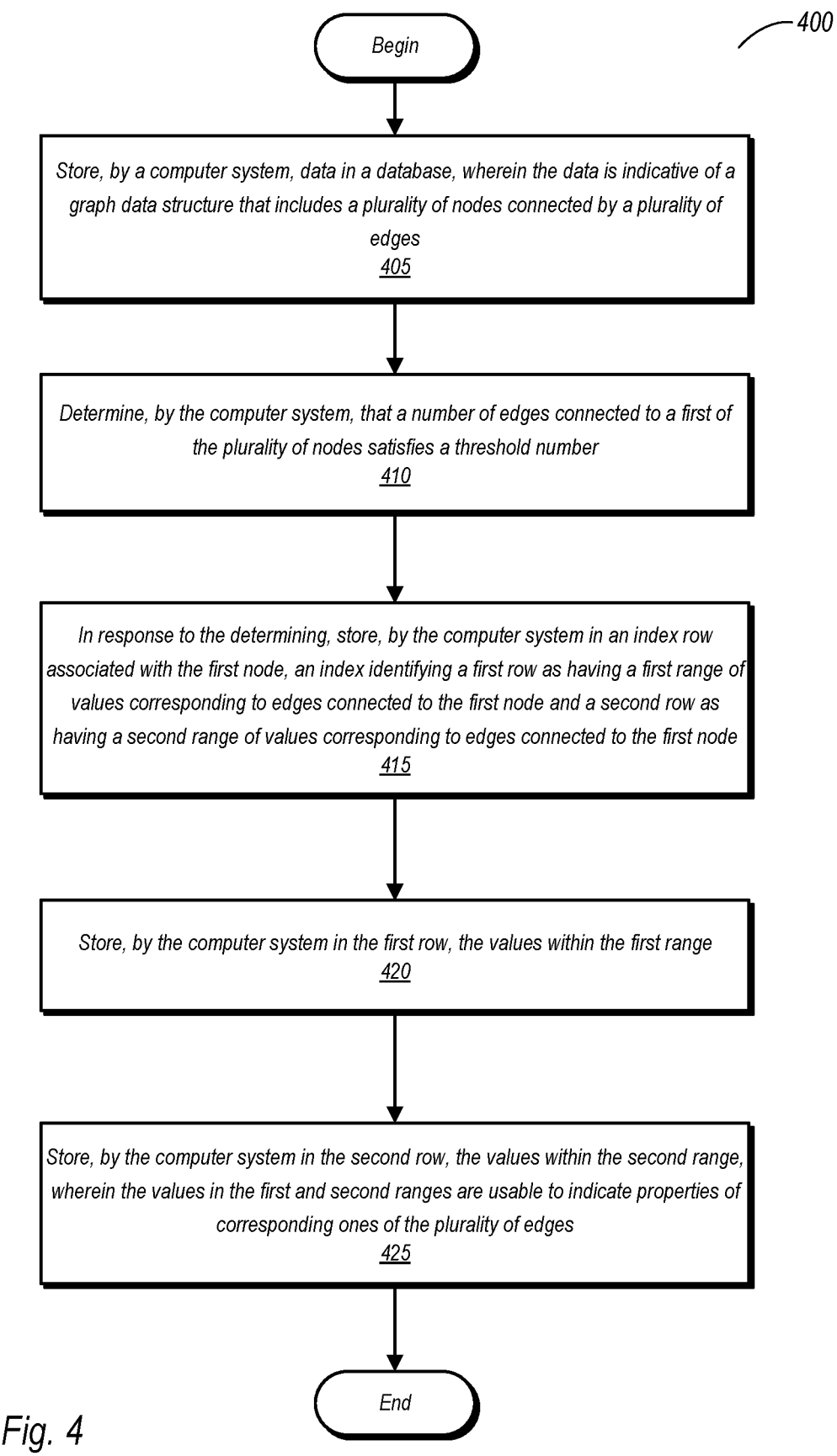
FIG. 4 is a flow diagram of one embodiment of a method for storing data in a database.

FIG. 4 is a flow diagram of one embodiment of a method for storing data in a database. Method 400 may be performed by various embodiments of a computer system operating on a database in accordance with the discussion above. More generally, Method 400 may apply to a database in which the information can be characterized by a graph structures having a number of nodes connected by a number of edges.

Method 400 includes storing, by a computer system, data in a database, wherein the data is indicative of a graph data structure that includes a plurality of nodes connected by a plurality of edges (block 405). The method further includes determining, by the computer system, that a number of edges connected to a first of the plurality of nodes satisfies a threshold number (block 410).

Various additional activities may be carried out in response to the determining. These activities include storing, by the computer system in an index row associated with the first node, an index identifying a first row as having a first range of values corresponding to edges connected to the first node and a second row as having a second range of values corresponding to edges connected to the first node (block 415). The method further includes storing, by the computer system in the first row, the values within the first range (block 420). Also included in Method 400 is the storing, by the computer system in the second row, the values within the second range (block 425). The values in the first and second ranges are usable to indicate properties of corresponding ones of the plurality of edges. These values may be stored along with other information in a corresponding edge record. Since these values are of a particular type, they may be used as a basis for indexing and sorting edge records in which they are included.

In various embodiments, the method includes receiving, by the computer system, a request to store information associated with an edge being connected to the first node, wherein the information includes a value indexable by the index. In response to the request, the method includes accessing, by the computer system, the index in the index row to identify one of the first row or the second row for storing the information based on the indexable value residing in one of the first range or the second range and storing, by the computer system, the information in the identified row.

Embodiments of the method may also include receiving, by the computer system, a query for information about an edge connected to the first node, wherein the query specifies a value corresponding to the edge and indexable by the index. In response to the query, the method further includes accessing, by the computer system, the index in the index row to identify one of the first row or the second row as storing the information based on the indexable value residing in one of the first range or the second range. Thereafter, the method includes retrieving, by the computer system, the information in the identified row.

In various embodiments, information within the identified row is sorted based on the stored values indexable by the index, and wherein the retrieving includes performance of a binary search on the stored values within the identified row. That is, for a given edge record including a number of values of different types, a given one of the values is used as a basis for indexing and sorting the value among edge records that include the same value type. For example, if the value that is indexable by the index is a date of an interaction between two nodes, edge records including the data information are sorted and indexed by date.

For various embodiments, and in response to determining that a size of the first row satisfies a size threshold, the method includes adding, by the computer system to the database, a third row to store values corresponding to edges connected to the first node, and further includes modifying, by the computer system, the index to identify the third row as having a third range of values.

In some embodiments, values within the first and second ranges are of a first data type supported by the index. In such embodiment, the method further comprises storing, by the computer system in a third row, values of a second data type and corresponding to edges coupled to the first node and storing, by the computer system in a fourth row, values of the second data type and corresponding to edges coupled to the first node. Such embodiments may also include storing, by the computer system in the index row, another index associated with the first node, wherein the second index identifies a third range of values for the values stored in the third row and a fourth range of values for the values stored in the fourth row.

Embodiments of the method may also utilize a global index. Accordingly, such embodiments include storing, by the computer system, a global index that associates values of a particular data type to rows of the database that correspond to two or more of the plurality of nodes. These embodiments of the method may also include receiving, by the computer system, a query for information corresponding to edges connected to the two or more nodes, wherein the query specifies values of the particular data type and in response to the query and based on the specified values, using, by the computer system, the global index to retrieve the information.

Figure 5:
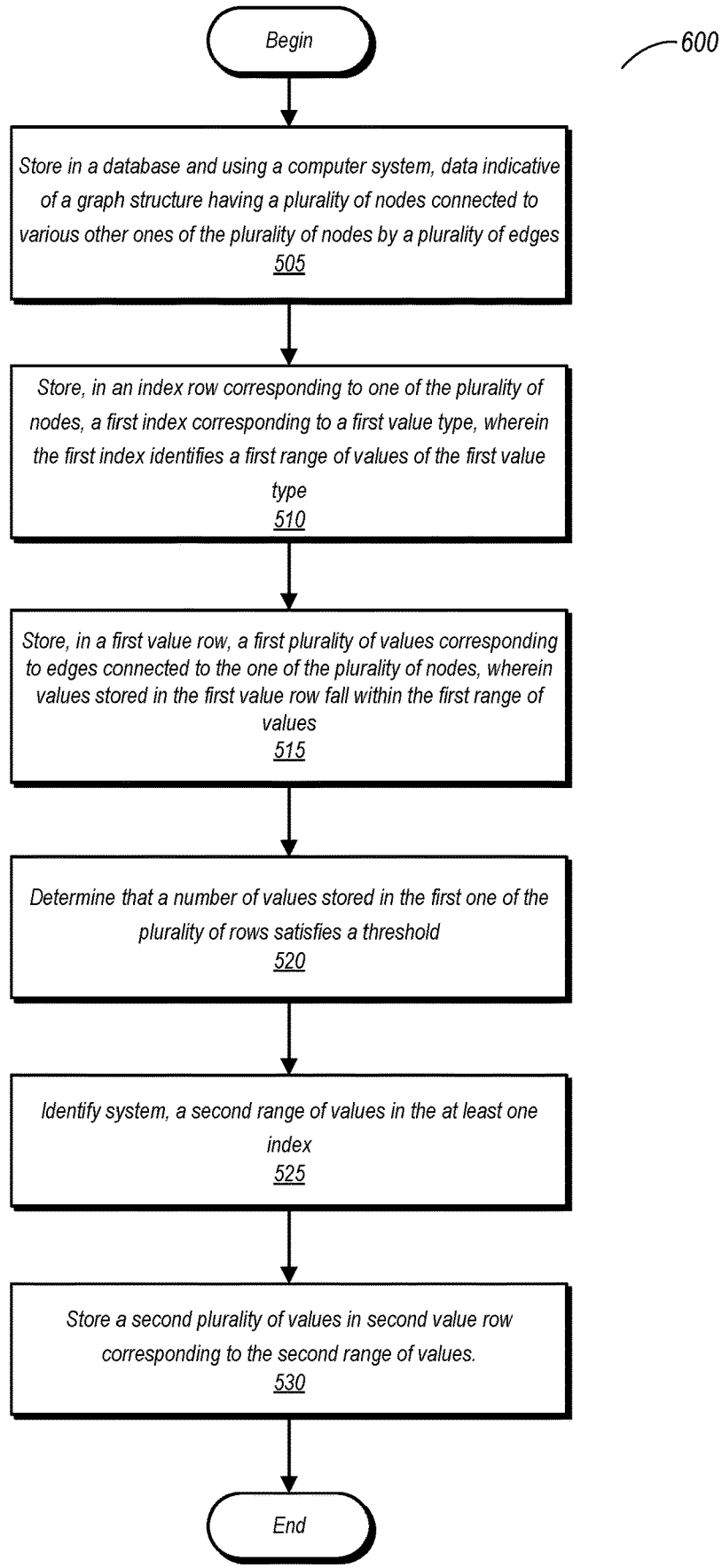
FIG. 5 is a flow diagram of another embodiment of another embodiment of a method for storing data in a database.

FIG. 5 is a flow diagram of another embodiment of another embodiment of a method for storing data in a database. Method 500 in the embodiment shown includes storing in a database and using a computer system, data indicative of a graph structure having a plurality of nodes connected to various other ones of the plurality of nodes by a plurality of edges (block 505). The storing of the data may include storing, in an index row corresponding to one of the plurality of nodes, a first index corresponding to a first value type, wherein the first index identifies a first range of values of the first value type (block 510). The storing of the data further includes storing, in a first value row, a first plurality of values corresponding to edges connected to the one of the plurality of nodes, wherein values stored in the first value row fall within the first range of values (block 515).

In various embodiments, the method includes determining that a number of values stored in the first one of the plurality of rows satisfies a threshold (block 520). Upon making such a determination, the method includes identifying system, a second range of values in the at least one index (block 525) and storing a second plurality of values in second value row corresponding to the second range of values (block 530).

In various embodiments, the method may include storing, in the index row, a second index corresponding to a second value type, wherein the second index identifies a third range of values corresponding to the second value type. Thereafter, the method may include storing a third plurality of values in at third value row, wherein the third value row corresponds to the third index, the third plurality of values corresponding to edges connected to the one of the plurality of nodes. The values stored in a given row may be part of corresponding edge records having additional information. The edge records stored in a given row may thus be indexed and sorted on the type of values.

In some embodiments, the method includes storing a global index that associates values of a particular data type to ones of the plurality of rows that correspond to two or more of the plurality of nodes. Such embodiment of the method may thus include receiving, at the computer system, a query for information corresponding to edges connected to two or more nodes, wherein the query specifies values of the particular data type. In response to the query and based on the specified values, the method includes the computer system using the global index to retrieve the information from one or more of the plurality of rows.

Figure 6:
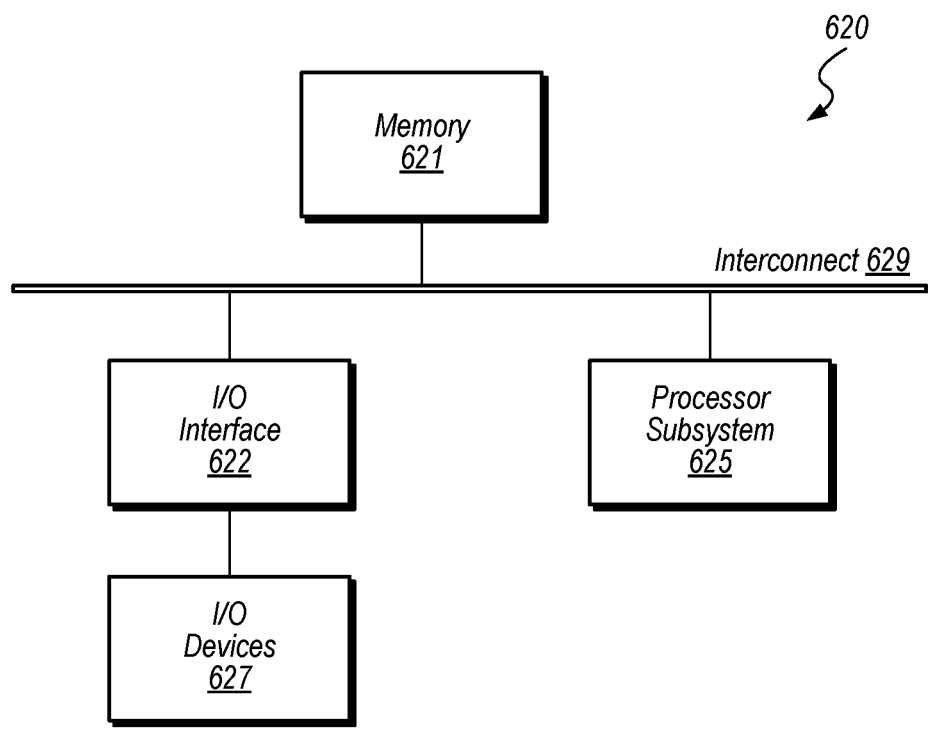
FIG. 6 is a block diagram of one embodiment of a computer system.

Example Computer System:

FIG. 6 is a block diagram of one embodiment of an example computer system. Instances of computer system 600 as shown here may be implemented, in various embodiments, in systems described above such as one implementing database 100, a client interfacing with database 100, etc.

Computer system 600 includes a processor subsystem 625 that is coupled to a system memory 621 and I/O interfaces(s) 622 via an interconnect 629 (e.g., a system bus). I/O interface(s) 622 is coupled to one or more I/O devices 627.

Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 625 may include one or more processors or processing units. In various embodiments of computer system 600, multiple instances of processor subsystem 625 may be coupled to interconnect 629. In various embodiments, processor subsystem 625 (or each processor unit within 625) may contain a cache or other form of on-board memory.

System memory 621 is usable store program instructions executable by processor subsystem 625 to cause system 600 perform various operations described herein such as those described with respect to database 100. System memory 621 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 621. Rather, computer system 600 may also include other forms of storage such as cache memory in processor subsystem 625 and secondary storage on I/O Devices 627 (e.g., a hard drive, storage array, etc.). In some embodiments, these other forms of storage may also store program instructions executable by processor subsystem 625.

I/O interfaces 622 may be any of various types of interfaces configured to couple to and communicate with other devices, according to various embodiments. In one embodiment, I/O interface 622 is a bridge chip (e.g., Southbridge) from a front-side to one or more back-side buses. I/O interfaces 622 may be coupled to one or more I/O devices 627 via one or more corresponding buses or other interfaces. Examples of I/O devices 627 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via an I/O device 627 implementing a network interface device (e.g., configured to communicate over Wi-Fi, Bluetooth, Ethernet, etc.).

In various embodiments, memory 621 of computer system 600 may include at least one non-transitory computer readable medium having instructions stored thereon that, when executed by computer system 600, carry out various embodiments of the method(s) discussed above. Thus, computer system 600 may be connected to or include storage for a database arranged according to the present disclosure.

In various embodiments, the instructions stored on the computer readable medium, when executed, cause the computer system to store data in a database, the data being indicative of a graph structure having a plurality of nodes connected by a plurality of edges, wherein the database includes a plurality of value rows. The execution of these instructions may also allow computer system 600 to determine that a number of edges connected to a first one of the plurality of nodes is at least a threshold value. In response to the determining, instructions may be executed to cause storing in a first value row, values within a first range of values, the first range of values being identified in a first index stored in an index row associated with the first node and storing in a second value row, values within a second range of values, the second range of values being identified in the first index. The values in the first and second ranges are usable to indicate a first type of properties corresponding to ones of the plurality of edges.

The instructions stored on the computer readable medium may also be executable to store the first index in the index row and store a second index in the index row, the second index having a third range of values. Values within the third range are usable to indicate a second type of properties corresponding to ones of the plurality of edges, the second type being different from the first type. The instructions are further executable to store, in a third value row, a value of a second type falling within the third range of values.

In various embodiments, the instructions are further executable to receive a query for information regarding an edge connected to the first node, wherein the query specifies a value corresponding to an edge having a value type of one of the first and second types. As part of the query, instructions may be executed to access one of the first and second indexes based on which of the first and second value types to which the value corresponds; and access the information from one of the plurality of rows based on the one of the first and second indexes accessed and a range in which the value falls.

The instructions stored on the computer readable medium are further executable to sort, in a particular one of the plurality of value rows, values indexable by an index and a range of values corresponding to the particular one of the plurality of rows. The instructions stored on the computer readable medium may also include those that are executable to determine that a size of a one of the plurality of rows satisfies a size threshold add, to the plurality of rows, an additional row, and modify an index corresponding to the additional row to identify the additional row as storing an additional range of values.

Various embodiments also include instructions executable to perform a binary search among a plurality of values in a given one of the plurality of rows in response to determining that a queried value is stored in the given row. Some instructions may be executable to store a global index that associates values of a particular data type to ones of the plurality of rows that correspond to two or more of the plurality of nodes. Also stored on the computer readable medium may be instructions executable to receive a query for information corresponding to edges connected to two or more nodes, wherein the query specifies values of the particular data type and, in response to the query and based on the specified values, use the global index to retrieve the information from one or more of the plurality of rows.

Numerous variations and modifications will become apparent to those skilled in the art once the above disclosure is fully appreciated. It is intended that the following claims be interpreted to embrace all such variations and modifications.

What is claimed is:

1. A method, comprising:
    storing, by a computer system, data in a database, wherein the data is indicative of a graph data structure that includes a plurality of nodes connected by a plurality of edges;
    determining, by the computer system, that a number of edges connected to a first node of the plurality of nodes satisfies a threshold number;

in response to the determining:
  storing, by the computer system in an index row associated with the first node, a first index identifying a first row as having a first range of values corresponding to edges connected to the first node and a second row as having a second range of values corresponding to edges connected to the first node, wherein values within the first and second ranges are of a first data type supported by the first index;
  storing, by the computer system in the index row, a second index associated with the first node, the second index identifying a third row as having a third range of values corresponding to edges connected to the first node, wherein values within the third range are of a second data type;
  storing, by the computer system in the first row, the values within the first range;
  storing, by the computer system in the second row, the values within the second range;
  storing, by the computer system in the third row, values within the third range of values; and
  wherein the values in the first and second ranges are usable to indicate properties of corresponding ones of the plurality of edges.

2. The method of claim 1, further comprising:
receiving, by the computer system, a request to store information associated with an edge being connected to the first node, wherein the information includes a value indexable by the first index;
in response to the request:
  accessing, by the computer system, the first index in the index row to identify one of the first row or the second row for storing the information based on the indexable value residing in one of the first range or the second range; and
  storing, by the computer system, the information in the identified row.

3. The method of claim 1, further comprising:
receiving, by the computer system, a query for information about an edge connected to the first node, wherein the query specifies a value corresponding to the edge and indexable by the first index;
in response to the query:
  accessing, by the computer system, the first index in the index row to identify one of the first row or the second row as storing the information based on the indexable value residing in one of the first range or the second range; and
  retrieving, by the computer system, the information in the identified row.

4. The method of claim 3, wherein information within the identified row is sorted based on the stored values indexable by the first index, and wherein the retrieving includes performance of a binary search on the stored values within the identified row.

5. The method of claim 1, further comprising:
in response to determining that a size of the first row satisfies a size threshold:
  adding, by the computer system to the database, a third fourth row to store values corresponding to edges connected to the first node; and
  modifying, by the computer system, the first index to identify the fourth row as having a fourth range of values.

6. The method of claim 1, further comprising:
storing, by the computer system in a fourth row, values of the second data type and corresponding to edges coupled to the first node
wherein the second index further identifies a fourth range of values for the values stored in the fourth row.

7. The method of claim 1, further comprising:
storing, by the computer system, a global index that associates values of a particular data type to rows of the database that correspond to two or more of the plurality of nodes.

8. The method of claim 7, further comprising:
receiving, by the computer system, a query for information corresponding to edges connected to the two or more nodes, wherein the query specifies values of the particular data type; and
in response to the query and based on the specified values, using, by the computer system, the global index to retrieve the information.

9. A non-transitory computer-readable storage medium storing program instructions executable by a computer system to perform operations comprising:
storing data in a database, the data being indicative of a graph structure having a plurality of nodes connected by a plurality of edges, wherein the database includes a plurality of value rows;
determining that a number of edges connected to a first node of the plurality of nodes is at least a threshold value;
in response to the determining:
  storing in a first value row, values within a first range of values, the first range of values being identified in a first index stored in an index row associated with the first node;
  storing in a second value row, values within a second range of values, the second range of values being identified in the first index, wherein the values in the first and second ranges are usable to indicate a first type of properties corresponding to ones of the plurality of edges; and
  storing a second index in the index row, the second index having a third range of values, wherein values within the third range are usable to indicate a second type of properties corresponding to ones of the plurality of edges, the second type being different from the first type.

10. The computer readable medium of claim 9, wherein the instructions are further executable to store, in a third value row, a value of the second type falling within the third range of values.

11. The computer readable medium of claim 10, wherein the instructions are further executable to:
receive a query for information regarding an edge connected to the first node, wherein the query specifies a value corresponding to an edge having a value type of one of the first and second types; and
access one of the first and second indexes based on which of the first and second value types to which the value corresponds; and
access the information from one of the plurality of rows based on the one of the first and second indexes accessed and a range in which the value falls.

12. The computer readable medium of claim 9, further comprising instructions executable to sort, in a particular one of the plurality of value rows, values indexable by an index and a range of values corresponding to the particular one of the plurality of rows.

13. The computer readable medium of claim 9, further comprising instructions executable to:
   determine that a size of a one of the plurality of rows satisfies a size threshold;
   add, to the plurality of rows, an additional row; and
   modify an index corresponding to the additional row to identify the additional row as storing an additional range of values.

14. The computer readable medium of claim 9, further comprising instructions executable to perform a binary search among a plurality of values in a given row of the plurality of rows in response to determining that a queried value is stored in the given row.

15. The computer readable medium of claim 9, further comprising instructions executable to store a global index that associates values of a particular data type to ones of the plurality of rows that correspond to two or more of the plurality of nodes.

16. The computer readable medium of claim 15, further comprising instructions executable to:
   receive a query for information corresponding to edges connected to two or more nodes, wherein the query specifies values of the particular data type; and
   in response to the query and based on the specified values, use the global index to retrieve the information from one or more of the plurality of rows.

17. A method comprising:
   storing in a database and using a computer system, data indicative of a graph structure having a plurality of nodes connected to various other ones of the plurality of nodes by a plurality of edges, wherein storing the data comprises:
      storing, in an index row corresponding to one of the plurality of nodes, a first index corresponding to a first value type and a second index corresponding to a second value type;
      storing, in a first value row of a plurality of rows, a first plurality of values corresponding to edges connected to the one of the plurality of nodes, wherein values stored in the first value row fall within a first range of values;
      determining that a number of values stored in the first value row of the plurality of rows satisfies a threshold;
      identifying a second range of values in the first index;
      storing a second plurality of values in second value row of the plurality of rows corresponding to the second range of values; and
      storing a third plurality of values in a third value row, wherein values of the third value row are of the second value type and correspond to edges connected to the one of the plurality of nodes.

18. The method of claim 17, further comprising:
   storing a global index that associates values of a particular value type to ones of the plurality of rows that correspond to two or more of the plurality of nodes;
   receiving, at the computer system, a query for information corresponding to edges connected to two or more nodes, wherein the query specifies values of the particular value type; and
   in response to the query and based on the specified values, the computer system using the global index to retrieve the information from one or more of the plurality of rows.

19. The method of claim 17, further comprising:
   receiving, by the computer system, a request to store information associated with an edge being connected to the one of the plurality of nodes, wherein the information includes a value indexable by the first index;
   in response to the request:
      accessing, by the computer system, the first index in the index row to identify one of the first row or the second row for storing the information based on the indexable value residing in one of the first range or the second range; and
      storing, by the computer system, the information in the identified row.

20. The method of claim 17, further comprising:
   receiving, by the computer system, a query for information about an edge connected to the one of the plurality of nodes, wherein the query specifies a value corresponding to the edge and indexable by the first index;
   in response to the query:
      accessing, by the computer system, the first index in the index row to identify one of the first row or the second row as storing the information based on the indexable value residing in one of the first range or the second range; and
   retrieving, by the computer system, the information in the identified row.

* * * * *

UNITED STATES PATENT AND TRADEMARK OFFICE
CERTIFICATE OF CORRECTION

PATENT NO. : 11,704,365 B2
APPLICATION NO. : 17/356192
DATED : July 18, 2023
INVENTOR(S) : Xin Li et al.

It is certified that error appears in the above-identified patent and that said Letters Patent is hereby corrected as shown below:

In the Claims

In Column 13 (Claim 5), Lines 62-63, please delete "a third fourth row" and insert -- a fourth row --.

Signed and Sealed this
Fifteenth Day of August, 2023

Katherine Kelly Vidal
*Director of the United States Patent and Trademark Office*